(12) United States Patent
Agiwal et al.

(10) Patent No.: US 12,022,527 B2
(45) Date of Patent: Jun. 25, 2024

(54) APPARATUS AND METHOD OF RANDOM ACCESS PROCEDURE

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/185,853

(22) Filed: Mar. 17, 2023

(65) Prior Publication Data

US 2023/0254905 A1    Aug. 10, 2023

Related U.S. Application Data

(63) Continuation of application No. 17/122,126, filed on Dec. 15, 2020, now Pat. No. 11,611,998.

(60) Provisional application No. 62/959,309, filed on Jan. 10, 2020.

(51) Int. Cl.
*H04W 74/08* (2009.01)
*H04W 52/24* (2009.01)
*H04W 72/20* (2023.01)
*H04W 72/40* (2023.01)
(Continued)

(52) U.S. Cl.
CPC ..... *H04W 74/0833* (2013.01); *H04W 52/242* (2013.01); *H04W 72/20* (2023.01); *H04W 72/40* (2023.01); *H04W 72/563* (2023.01)

(58) Field of Classification Search
CPC .......... H04W 74/0833; H04W 72/563; H04W 72/40
See application file for complete search history.

(56) References Cited

U.S. PATENT DOCUMENTS

| | | | |
|---|---|---|---|
| 2010/0074222 A1* | 3/2010 | Wu | H04L 1/1887 370/331 |
| 2013/0044657 A1 | 2/2013 | Oh et al. | |
| 2018/0103465 A1 | 4/2018 | Agiwal et al. | |

(Continued)

FOREIGN PATENT DOCUMENTS

| | | |
|---|---|---|
| CN | 109219972 A | 1/2019 |
| CN | 109804697 A | 5/2019 |

(Continued)

OTHER PUBLICATIONS

International Search Report dated Mar. 26, 2021, issued in an International Application No. PCT/KR2020/018342.

(Continued)

*Primary Examiner* — Brenda H Pham
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method for performing a random access procedure in a wireless communication system is provided.

12 Claims, 11 Drawing Sheets

(51) Int. Cl.
  *H04W 72/563* (2023.01)
  *H04W 74/0833* (2024.01)

(56) References Cited

U.S. PATENT DOCUMENTS

| | | |
|---|---|---|
| 2018/0124822 A1 | 5/2018 | Wang et al. |
| 2018/0205516 A1 | 7/2018 | Jung et al. |
| 2018/0220345 A1 | 8/2018 | Moon et al. |
| 2018/0279186 A1 | 9/2018 | Park et al. |
| 2018/0279376 A1 | 9/2018 | Dinan et al. |
| 2019/0029029 A1* | 1/2019 | Ohtsuji ................. H04W 4/023 |
| 2019/0320467 A1 | 10/2019 | Freda et al. |
| 2019/0357267 A1 | 11/2019 | Martin et al. |
| 2019/0387541 A1 | 12/2019 | Agiwal et al. |
| 2020/0059285 A1 | 2/2020 | Zhang et al. |
| 2020/0145089 A1 | 5/2020 | Wei et al. |
| 2021/0136832 A1 | 5/2021 | Agiwal et al. |
| 2021/0378018 A1 | 12/2021 | Jang et al. |
| 2022/0061055 A1* | 2/2022 | Freda ................... H04W 72/53 |

FOREIGN PATENT DOCUMENTS

| | | |
|---|---|---|
| CN | 110574482 A | 12/2019 |
| EP | 3014940 A1 | 5/2016 |
| KR | 10-2011-0119484 A | 11/2011 |
| KR | 10-2019-0105035 A | 9/2019 |
| WO | 2014/015470 A1 | 1/2014 |
| WO | 2014-209077 A1 | 12/2014 |

OTHER PUBLICATIONS

Intel Corporation, 'Remaining issues on PUSCH resource unit selection for 2-step RACH', R2-1914843, 3GPP TSG RAN WG2 #108, pp. 1-4; Nov. 8, 2019, Reno, Nevada, USA.

Nokia et al., 'Discussion on the support of simultaneous mode 1 and mode 2', R2-1915195, 3GPP TSG-RAN WG2 Meeting #108, sections 2-3; Nov. 7, 2019, Reno, USA.

Samsung, 'Discussion on Sidelink UE Information Initiation Trigger for NR V2X Sidelink Communication', R2-1912443, 3GPP TSG-RAN WG2 Meeting #107bis, sections 2-3; Oct. 4, 2019, Chongqing, China.

ZTE Corporation et al: "Running MAC CR for 2-step RACH", 3GPP Draft; R2-1914798, 3rd Generation Partnership Project (3GPP), Mobile Competence Centre ; 650, Route Des Lucioles ; F-06921 Sophia-Antipolis Cedex ; France, RAN WG2, Reno, USA; Nov. 7, 2019 (Nov. 7, 2019), XP051815768.

Ericsson: "Procedure for Two-step RACH", 3GPP Draft; R1-1912672, 3rd Generation Partnership Project (3GPP), Mobile Competence Centre ; 650, Route Des Lucioles ; F-06921 Sophia-Antipolis Cedex ; France, RAN WG1, Reno, USA; Nov. 9, 2019 (Nov. 9, 2019), XP051823524.

"3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre ; 650, Route Des Lucioles ; F-06921 Sophia-Antipolis Cedex ; France, RAN WG2, V15.8.0 Jan. 7, 2020 (Jan. 7, 2020), pp. 1-78, XP051860530.

Extended European Search Report dated Dec. 8, 2022, issued in European Application No. 20911867.8.

ZTE Corporation et al., Draft MAC CR for 2-step CFRA, 3GPP Draft, R2-1915268, 3GPP TSG-RAN WG2 Meeting #108, Reno, USA, Nov. 8, 2019.

European Office Action dated Nov. 14, 2023, issued in European Patent Application No. 20911867.8.

Mediatek Inc., 2-step CBRA procedure, R2-1812342, 3GPP TSG-RAN WG2 Meeting ∩103, Aug. 10, 2018.

ZTE, Summary of 7.2.1.2 Procedure for Two-step RACH, R1-1903436, 3GPP TSG RAN WG1 #96, Mar. 4, 2019.

Chinese Office Action dated Apr. 26, 2024, issued in Chinese Patent Application No. 202080092531.1.

* cited by examiner

APPARATUS AND METHOD OF RANDOM ACCESS PROCEDURE

CROSS-REFERENCE TO RELATED APPLICATION(S)

This application is a continuation application of prior application Ser. No. 17/122,126, filed on Dec. 15, 2020, which will be issued as U.S. Pat. No. 11,611,998 on Mar. 21, 2023 and is based on and claims priority under 35 U.S.C § 119(e) of a U.S. Provisional application Ser. No. 62/959,309, filed on Jan. 10, 2020, in the U.S. Patent and Trademark Office, the disclosure of which is incorporated by reference herein in its entirety.

BACKGROUND

1. Field

The disclosure relates to an apparatus and a method of performing random access procedure.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In accordance with an aspect of the disclosure, a method performed by a terminal for 2-step random access procedure in a wireless communication system is provided. The method includes identifying that contention-free random access resources for 2-step random access is not configured, identifying whether one of a first preamble group or a second preamble group is selected for a previous random access preamble transmission attempt during the 2-step random access procedure, in case that the one of the first preamble group or the second preamble group is selected, selecting a same preamble group used for the previous random access preamble transmission attempt, for transmitting a contention-based random access preamble on a physical random access channel (PRACH), and transmitting, to a base station, a message including the PRACH and a physical uplink shared channel (PUSCH).

In accordance with another aspect of the disclosure, a terminal for 2-step random access procedure in a wireless communication system is provided. The terminal includes a transceiver and a controller coupled with the transceiver and configured to control to identify that contention-free random access resources for 2-step random access is not configured, identify whether one of a first preamble group or a second preamble group is selected for a previous random access preamble transmission attempt during the 2-step random access procedure, in case that the one of the first preamble group or the second preamble group is selected, select a same preamble group used for the previous random access preamble transmission attempt, for transmitting a contention-based random access preamble on a physical random access channel (PRACH), and transmit, to a base station, a message including the PRACH and a physical uplink shared channel (PUSCH).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
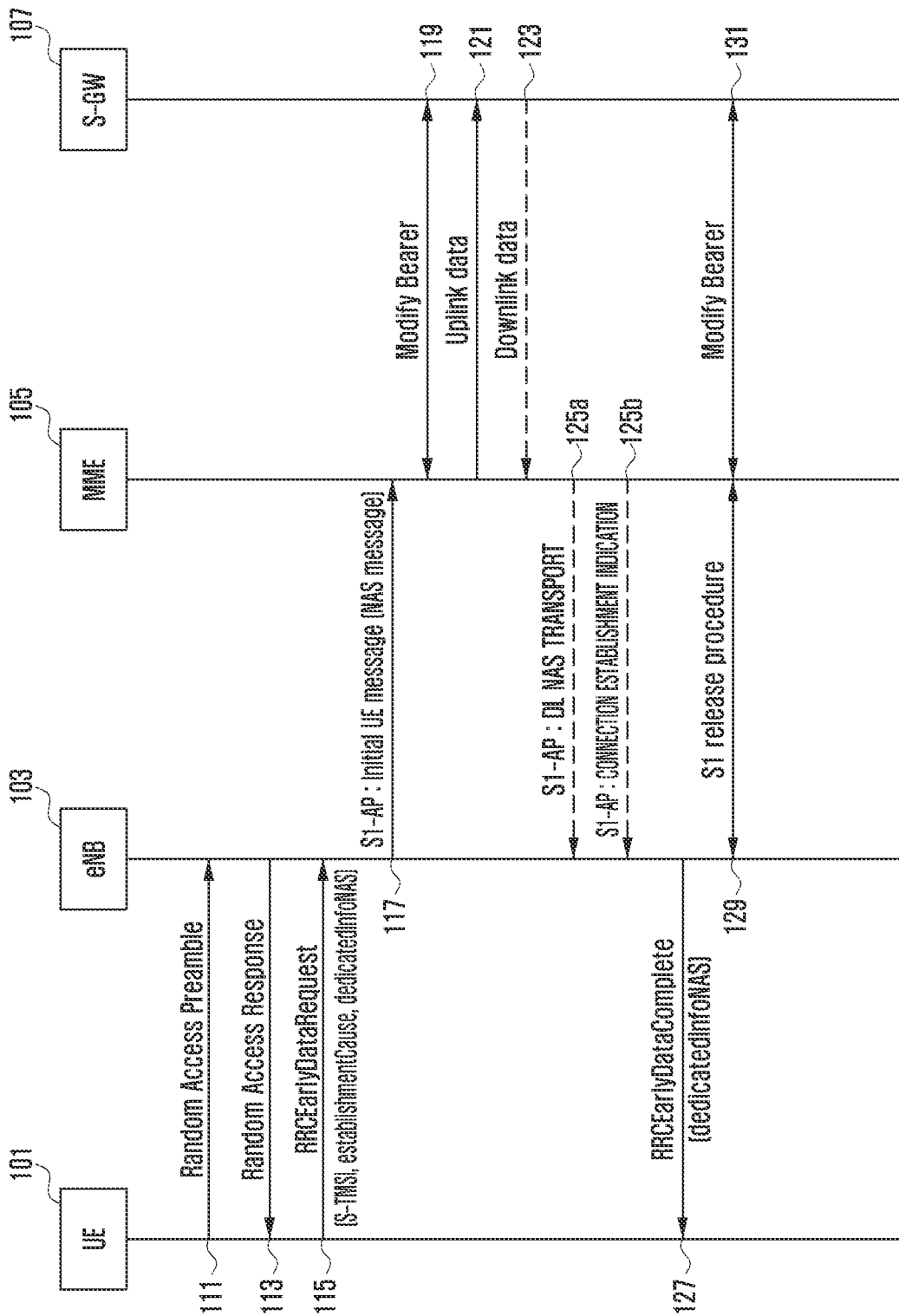
FIG. 1 shows an operation for explaining an example of early data transmission (EDT) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), fifth generation (5G) NB (5gNB), or next generation NB (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system (also referred as next generation radio or new radio (NR)) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the wireless broadband subscribers needing internet connectivity everywhere according to the related art, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-Radio Access Technology (RAT) Dual Connectivity (MR-DC) operation whereby a UE in radio resource control (RRC)_CONNECTED is configured to utilize radio resources provided by two distinct schedulers, located in two different nodes connected via a non-ideal backhaul and providing either evolved-universal terrestrial radio access (E-UTRA) (i.e. if the node is an ng-eNB) or NR access (i.e. if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells (SCells). In NR the term Master Cell Group (MCG) refers to a group of serving cells associated with the Master Node, comprising of the primary cell (PCell) and optionally one or more SCells. In NR the term Secondary Cell Group (SCG) refers to a group of serving cells associated with the Secondary Node, comprising of the primary SCell (PSCell) and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, Physical Downlink Control Channel (PDCCH) is used to schedule downlink (DL) transmissions on physical downlink shared channel (PDSCH) and uplink (UL) transmissions on PUSCH, where the Downlink Control Information (DCI) on PDCCH includes: Downlink assignments containing at least modulation and coding format, resource allocation, and hybrid-automatic repeat request (ARQ) information related to downlink scheduling (DL-SCH); Uplink scheduling grants containing at least modulation and coding format, resource allocation, and hybrid-ARQ information related to uplink scheduling (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource blocks (PRB(s)) and orthogonal frequency division multiplexing (OFDM) symbol(s) where the UE may assume no transmission is intended for the UE; Transmission of transmit power control (TPC) commands for physical uplink control channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRB s with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase-shift keying (QPSK) modulation is used for PDCCH.

In fifth generation wireless communication system, a list of search space configurations are signaled by gNB for each configured bandwidth part (BWP) wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each CORESET configuration is associated with a list of transmission configuration indicator (TCI) states. One DL RS ID (synchronization signal block (SSB) or channel state information reference signal (CSI RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

Contention Based Random Access (CBRA)

This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB.

The RA-RNTI is calculated as follows:

$$RA\text{-}RNTI=1+s\_id+14*t\_id+14*80*f\_id+14*80*8*ul\_carrier\_id,$$

where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); fid is the index of the PRACH occasion within the slot in the frequency domain ($0 \leq f\_id < 8$), and ul carrier id is the UL carrier used for Msg1 transmission (0 for normal UL (NUL) carrier and 1 for supplementary UL (SUL) carrier.

Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention Free Random Access (CFRA)

This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles are typically provided for a subset of SSB s/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So, during the RA procedure, one random access attempt can be CFRA while other random access attempt can be CBRA.

2 Step Contention Based Random Access (2 Step CBRA)

In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/transmission/reception point (TRP) switching indication, connection re-establishment indication, reconfiguration complete or handover complete message, etc.

2 Step Contention Free Random Access (2 Step CFRA)

In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles are typically provided for a subset of SSB s/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the random access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-ThresholdSSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformationAreaID.

UE acquires SIB 1 from the camped or serving cell. UE check the BroadcastStatus bit in SIB 1 for SI message which UE needs to acquire. SI request configuration for SUL is signalled by gNB using the IE si-RequestConfigSUL in SIB1. If the IE si-RequestConfigSUL is not present in SIB1, UE considers that SI request configuration for SUL is not signalled by gNB. SI request configuration for NUL is signalled by gNB using the IE si-RequestConfig in SIB 1. If the IE si-RequestConfig is not present in SIB1, UE considers that SI request configuration for NUL is not signalled by gNB. If SI message which UE needs to acquire is not being broadcasted (i.e. BroadcastStatus bit is set to zero), UE initiates transmission of SI request. The procedure for SI request transmission is as follows:

If SI request configuration is signaled by gNB for SUL, and criteria to select SUL is met (i.e. RSRP derived from SSB measurements of camped or serving cell <rsrp-ThresholdSSB-SUL, where rsrp-ThresholdSSB-SUL is signaled by gNB (e.g. in broadcast signaling such as SIB1)): UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e. Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL is met (i.e. NUL is selected if SUL is supported in camped or serving cell and RSRP derived from SSB measurements of camped or serving cell >=rsrp-ThresholdSSB-SUL; OR NUL is selected if SUL is not supported in serving cell): UE initiate transmission of SI request based on Msg1 based SI request on NUL (350). In other words, UE initiates Random Access procedure using the PRACH preamble(s) and PRACH resource(s) in SI request configuration of NUL. UE transmits Msg1 (i.e. Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiate transmission of SI request based on Msg3 based SI request. In other words, UE initiate transmission of RRCSystemInfoRequest message (345). UE transmits Msg1 (i.e. Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e. RRCSystemInfoRequest message). If acknowledgement for SI request (i.e. RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell <rsrp-ThresholdSSB-SUL where rsrp-ThresholdSSB-SUL is signaled by gNB (e.g. in broadcast signaling such as SIB1). NUL is the selected UL carrier, if RSRP derived from SSB measurements of camped or serving cell >=rsrp-ThresholdSSB-SUL where rsrp-ThresholdSSB-SUL is signaled by gNB (e.g. in broadcast signaling such as SIB1).

4G wireless communication system supports early data transmission (EDT). EDT allows one uplink data transmission optionally followed by one downlink data transmission during the random access procedure. EDT is triggered when the upper layers have requested the establishment or resumption of the RRC Connection for Mobile Originated data (i.e., not signaling or SMS) and the uplink data size is less than or equal to a TB size indicated in the system information.

FIG. 1 shows an operation for explaining an example of early data transmission (EDT) according to an embodiment of the disclosure.

Referring to FIG. 1, in one approach of EDT, uplink user data are transmitted in a NAS message concatenated in UL RRCEarlyDataRequest message on CCCH. Downlink user data are optionally transmitted in a NAS message concatenated in DL RRCEarlyDataComplete message on CCCH. There is no transition to RRC CONNECTED. The detailed procedure (see FIG. 1) is as follows:

Steps 111-113. Upon connection establishment request for Mobile Originated data from the upper layers, the UE (101) initiates the early data transmission procedure and selects a random access preamble configured for EDT.

Step 115. UE sends RRCEarlyDataRequest message concatenating the user data on CCCH.

Step 117. The eNB (103) initiates the S1-AP Initial UE message procedure to forward the NAS message and establish the S1 connection. The eNB may indicate in this procedure that this connection is triggered for EDT.

Step 119. The MME (105) requests the S-GW (107) to re-activate the EPS bearers for the UE.

Step 121. The MME sends the uplink data to the S-GW.

Step 123. If downlink data are available, the S-GW sends the downlink data to the MME.

Steps 125a-125b. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

Step 127. If no further data are expected, the eNB can send the RRCEarlyDataComplete message on CCCH to keep the UE in RRC_IDLE. If downlink data were received in step 6, they are concatenated in RRCEarlyDataComplete message.

Steps 129-131. The S1 connection is released and the EPS bearers are deactivated.

NOTE: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received in msg5.

Figure 2:
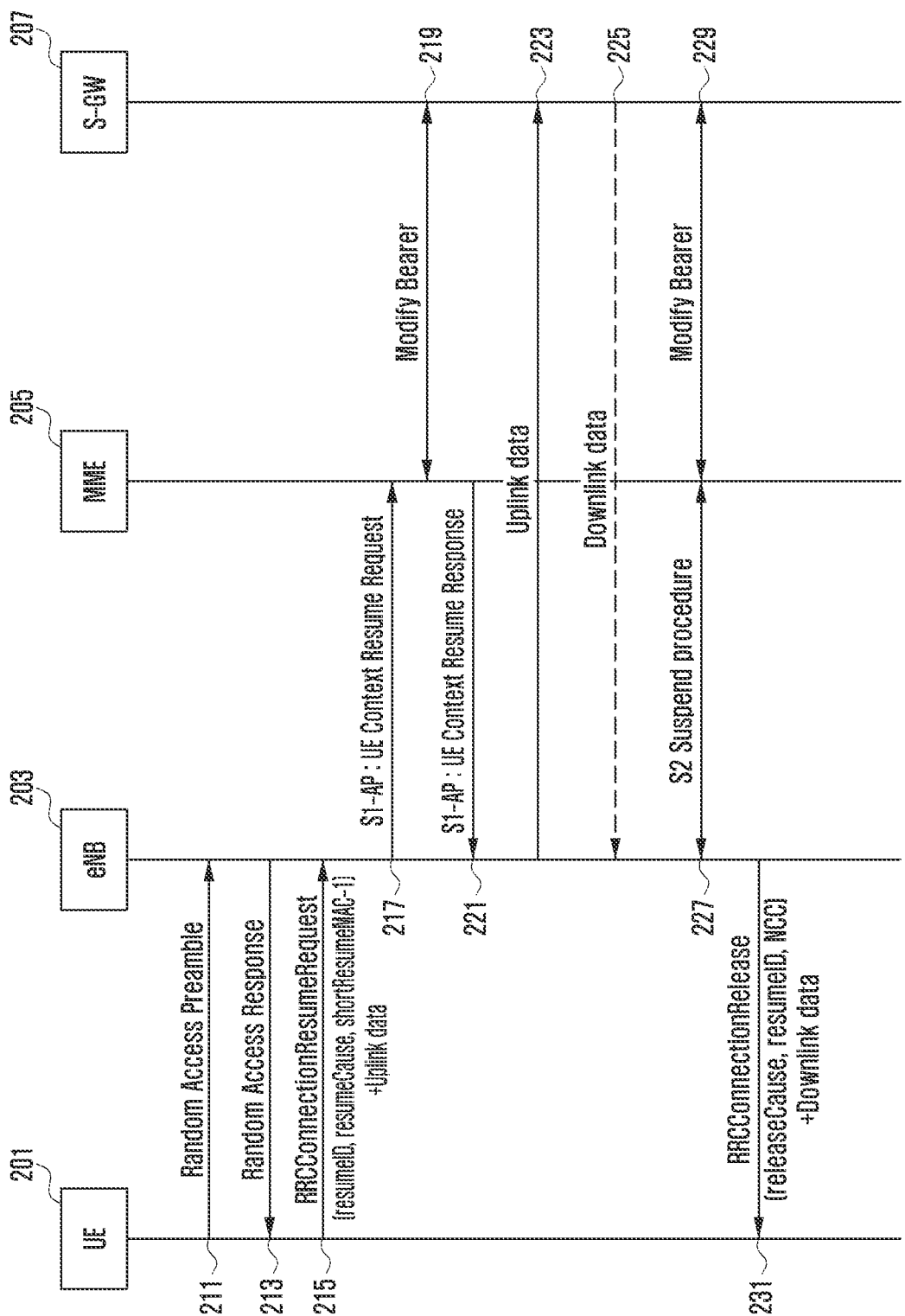
FIG. 2 shows an operation for explaining another example of EDT according to an embodiment of the disclosure.

FIG. 2 shows an operation for explaining another example of EDT according to an embodiment of the disclosure.

Referring to FIG. 2, in another approach of EDT, the UE has been provided with a NextHopChainingCount in the RRCConnectionRelease message with suspend indication. Uplink user data are transmitted on DTCH multiplexed with UL RRCConnectionResumeRequest message on CCCH. Downlink user data are optionally transmitted on DTCH multiplexed with DL RRCConnectionRelease message on DCCH. The short resume MAC-I is reused as the authentication token for RRCConnectionResumeRequest message and is calculated using the integrity key from the previous connection. The user data in uplink and downlink are ciphered. The keys are derived using the NextHopChainingCount provided in the RRCConnectionRelease message of the previous RRC connection. The RRCConnectionRelease message is integrity protected and ciphered using the newly derived keys. There is no transition to RRC CONNECTED. The detailed procedure (see FIG. 2) is as follows:

Steps 211-213. Upon connection resumption request for Mobile Originated data from the upper layers, the UE (201) initiates the early data transmission procedure and selects a random access preamble configured for EDT.

Step 215. The UE sends an RRCConnectionResumeRequest to the eNB (203), including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

Step 217. The eNB initiates the S1-AP Context Resume procedure to resume the S1 connection and re-activate the S1-U bearers.

Step 219. The MME (205) requests the S-GW (207) to re-activate the S1-U bearers for the UE.

Step 221. The MME confirms the UE context resumption to the eNB.

Step 223. The uplink data are delivered to the S-GW.

Steps 225. If downlink data are available, the S-GW sends the downlink data to the eNB.

Steps 227-229. If no further data are expected from the S-GW, the eNB can initiate the suspension of the S1 connection and the deactivation of the S1-U bearers.

Step 231. The eNB sends the RRCConnectionRelease message to keep the UE in RRC_IDLE. The message includes the release Cause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message.

4G and 5G wireless communication system supports vehicular communication services. Vehicular communication services, represented by vehicle-to-everything (V2X) services, can consist of the following four different types: V2V, V2I, V2N and V2P. In fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 3:
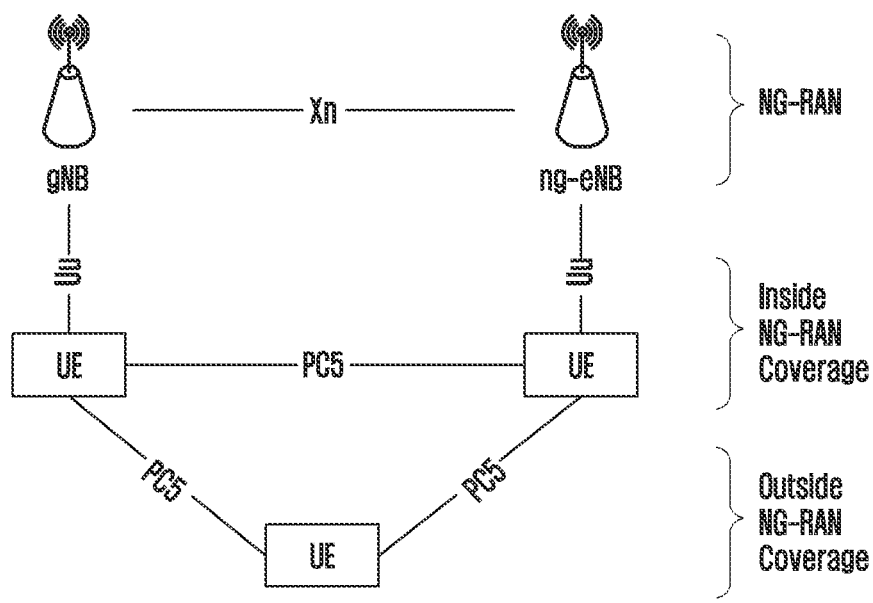
FIG. 3 illustrates next generation RAN (NG-RAN) architecture supporting PC5 interface according to an embodiment of the disclosure.

FIG. 3 illustrates NG-RAN architecture supporting PC5 interface according to an embodiment of the disclosure.

Referring to FIG. 3, V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 3. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. Unicast transmission, characterized by support of at least one PC5-RRC connection between peer UEs; Transmission and reception of control information and user traffic between peer UEs in sidelink; Support of sidelink HARQ feedback; Support of RLC AM; and Support of sidelink RLM for both peer UEs to detect RLF. Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The AS protocol stack for the control plane in the PC5 interface consists of RRC, packet data convergence protocol (PDCP), RLC and MAC sublayer, and the physical layer. The AS protocol stack for user plane in the PC5 interface consists of SDAP, PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer provides the following services and functions over the PC5 interface:—Radio resource selection; Packet filtering; Priority handling between uplink and sidelink transmissions for a given UE; Sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC PDU as specified in subclause 8.x. Logical Channel Identifier (LCID) included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;
STCH can be mapped to SL-SCH;
SBCCH can be mapped to SL-BCH.

The RRC sublayer provides the following services and functions over the PC5 interface:

Transfer of a PC5-RRC message between peer UEs;
Maintenance and release of a PC5-RRC connection between two UEs;
Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:
The UE needs to be RRC_CONNECTED in order to transmit data;
NG-RAN schedules transmission resources.
UE autonomous resource selection, characterized by:
The UE can transmit data when inside NG-RAN coverage, irrespective of which RRC state the UE is in, and when outside NG-RAN coverage;
The UE autonomously selects transmission resources from a pool of resources.

For NR sidelink communication, the UE performs sidelink transmissions only on a single carrier.

Scheduled Resource Allocation

NG-RAN can dynamically allocate resources to the UE via the SL-RNTI on PDCCH(s) for NR sidelink Communication. In addition, NG-RAN can allocate sidelink resources to UE with two types of configured sidelink grants:

With type 1, RRC directly provides the configured sidelink grant for NR sidelink communication With type 2, RRC provides the periodicity of the configured sidelink grant while PDCCH can either signal and activate the configured sidelink grant, or deactivate it. The PDCCH provides the actual grant (i.e. resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE sends SL BSR for dynamic resource allocation, in following cases:

SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";

UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";

retx-BSR-TimerSL expires and the MAC entity has data available for transmission for any of the sidelink logical channels, in which case the Sidelink BSR is referred below to as "Regular Sidelink BSR";

periodic-BSR-TimerSL expires, in which case the Sidelink BSR is referred below to as "Periodic Sidelink BSR".

UE Autonomous Resource Allocation

The UE autonomously selects sidelink grant from a pool of resources provided by broadcast system information or dedicated signaling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with global navigation satellite system (GNSS) in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

UE can be configured with both scheduled resource allocation (i.e. Mode 1 or M1) and autonomous resource allocation (i.e. Mode 2 or M2) scheduling modes. gNB indicates scheduling mode (Mode 1 or Mode 2) associated with each SL LCH. Based on NW/UE trigger scheduling mode may be changed for one or more logical channels. In case scheduling mode is changed, it is proposed to trigger SL BSR. However, triggering SL BSR whenever mode changes leads to unnecessary overhead.

Scheduling Mode is Changed from M2 to M1 for One or More SL LCH(s)

It is noted that the methods disclosed in this embodiment are also applicable for the case when scheduling mode is changed from M2 to M1+M2 for one or more SL LCH(s).

Method 1 gNB signals scheduling mode (M1 or M2 or both) associated with each SL LCH. The signaling can be via RRC message. Later scheduling mode associated with one or more SL LCHs is changed by gNB wherein the gNB sends RRC signaling message (or another signaling method such as MAC CE) with updated association between SL LCH(s) and scheduling modes. Scheduling mode associated with one or more SL LCHs can also be changed by UE when criteria to change mode is met. The criteria can be based on SL quality or Channel Busy Ratio (CBR) measurement of SL resources, etc.

Figure 4:
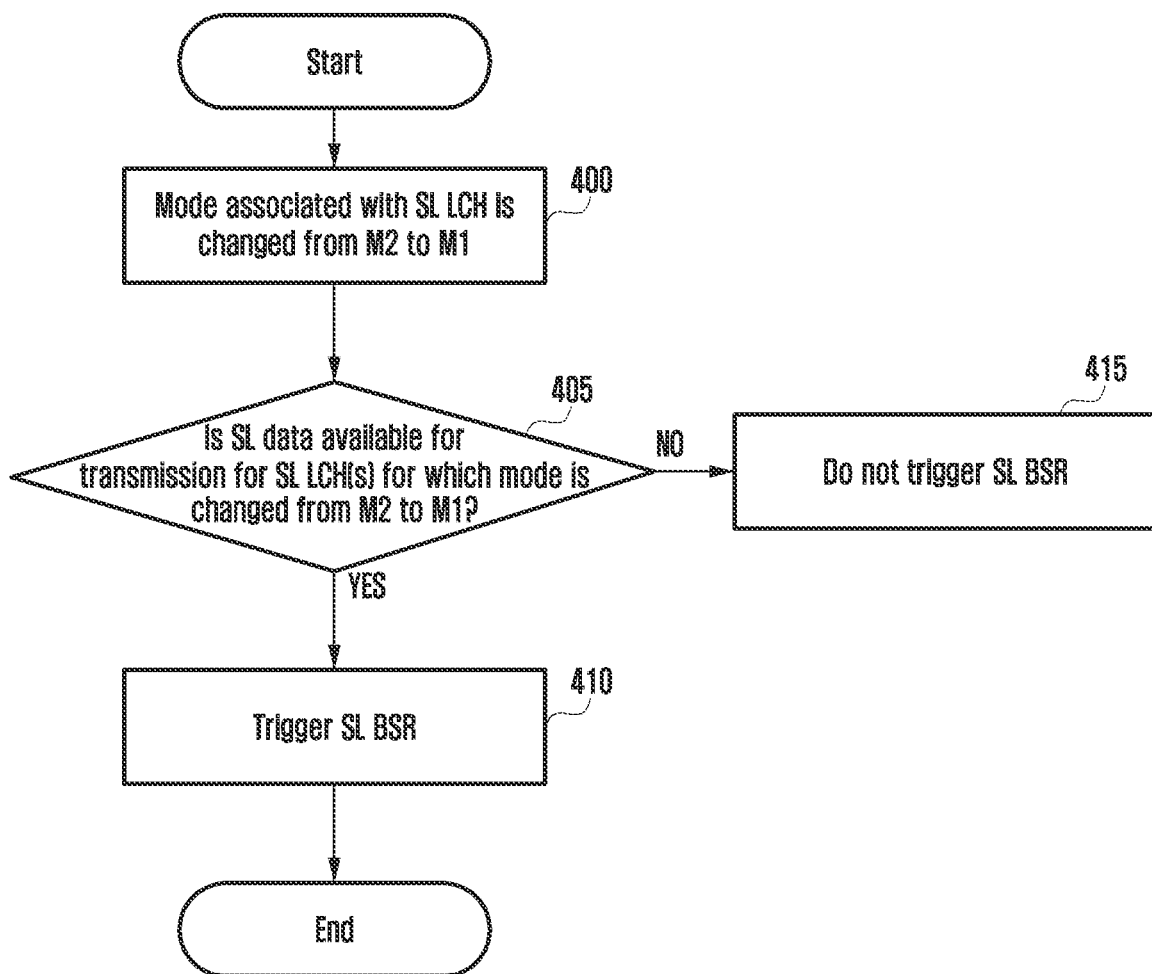
FIG. 4 illustrates an embodiment of user equipment (UE) operation when scheduling mode is changed from M2 to M1 for one or more sidelink logical channels (SL LCHs) according to an embodiment of the disclosure.

FIG. 4 illustrates an embodiment of UE operation when scheduling mode is changed from M2 to M1 for one or more SL LCHs according to an embodiment of the disclosure.

Referring to FIG. 4, UE operation when scheduling mode is changed from M2 (i.e. UE autonomous Resource Allocation) to M1 (i.e. Scheduled Resource Allocation) for one or more SL LCHs at operation 400 is as follows:

In an embodiment of this method, if SL data (i.e. packets or RLC SDUs) is available for transmission in the RLC entity of SL LCH for which mode is changed from M2 to M1 at operation 405, UE (i.e. MAC entity in UE) triggers SL BSR (step 410). If not, UE does not trigger SL BSR at operation 415. Note that if this condition is met for multiple SL LCHs, only one SL BSR is triggered.

In another embodiment of this method, if SL data (i.e. packets or PDCP SDUs) is available for transmission in the PDCP entity of SL LCH for which mode is changed from M2 to M1 at operation 405, UE (i.e. MAC entity in UE) triggers SL BSR at operation 410. If not, UE does not trigger SL BSR at operation 415. Note that if this condition is met for multiple SL LCHs, only one SL BSR is triggered.

In another embodiment of this method, if SL data for a logical channel (of a destination) for which mode is changed from M2 to M1 and which belongs to an LCG, becomes available to the MAC entity at operation 405, UE (i.e. MAC entity in UE) triggers SL BSR (step 410). If not, UE does not trigger SL BSR at operation 415. Note that if this condition is met for multiple SL LCHs, only one SL BSR is triggered.

In another embodiment of this method, if SL data for a SL LCH of a destination for which mode is changed from M2 to M1, becomes available to the MAC entity at operation 410, UE (i.e. MAC entity in UE) triggers SL BSR at operation 410. If not, UE does not trigger SL BSR at operation 415. Note that if this condition is met for multiple SL LCHs, only one SL BSR is triggered.

For the triggered SL BSR, UE includes SL BSR MAC CE in MAC PDU and transmit it to the gNB using UL SCH resource. If UL SCH resource is not available or if UL SCH resource is available but the SL BSR MAC CE cannot be accommodated in the UL SCH resource, UE may also trigger scheduling request wherein scheduling request is sent to gNB using PUCCH resource.

In an embodiment, triggered SL BSR is a regular SL BSR. SL BSR MAC CE for SL BSR includes data volume for one or more LCGs wherein for each reported LCG, 'buffer size, LCG ID and destination index' is included in SL BSR.

In another embodiment, triggered SL BSR is a truncated SL BSR wherein data volume of LCG(s) associated with SL LCH(s) for which mode is changed is reported. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a truncated SL BSR wherein data volume of LCG(s) associated with SL LCH(s) for which 'mode is changed and SL data is available for transmission' is reported. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a special SL BSR wherein data volume of LCG(s) associated with SL LCH(s) for which mode is changed is reported. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

In another embodiment, triggered SL BSR is a special SL BSR wherein data volume of LCG(s) associated with SL LCH(s) for which 'mode is changed and SL data is available for transmission' is reported. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

Method 2 gNB signals scheduling mode (M1 or M2 or both) associated with each SL LCH. The signaling can be via RRC message. Later scheduling mode associated with one or more SL LCHs is changed by gNB wherein the gNB sends RRC signaling message (or another signaling method such as MAC CE) with updated association between SL LCH(s) and scheduling modes. Scheduling mode associated with one or more SL LCHs can also be changed by UE when criteria to change mode is met. The criteria can be based on SL quality or CBR measurement of SL resources, etc.

Figure 5:
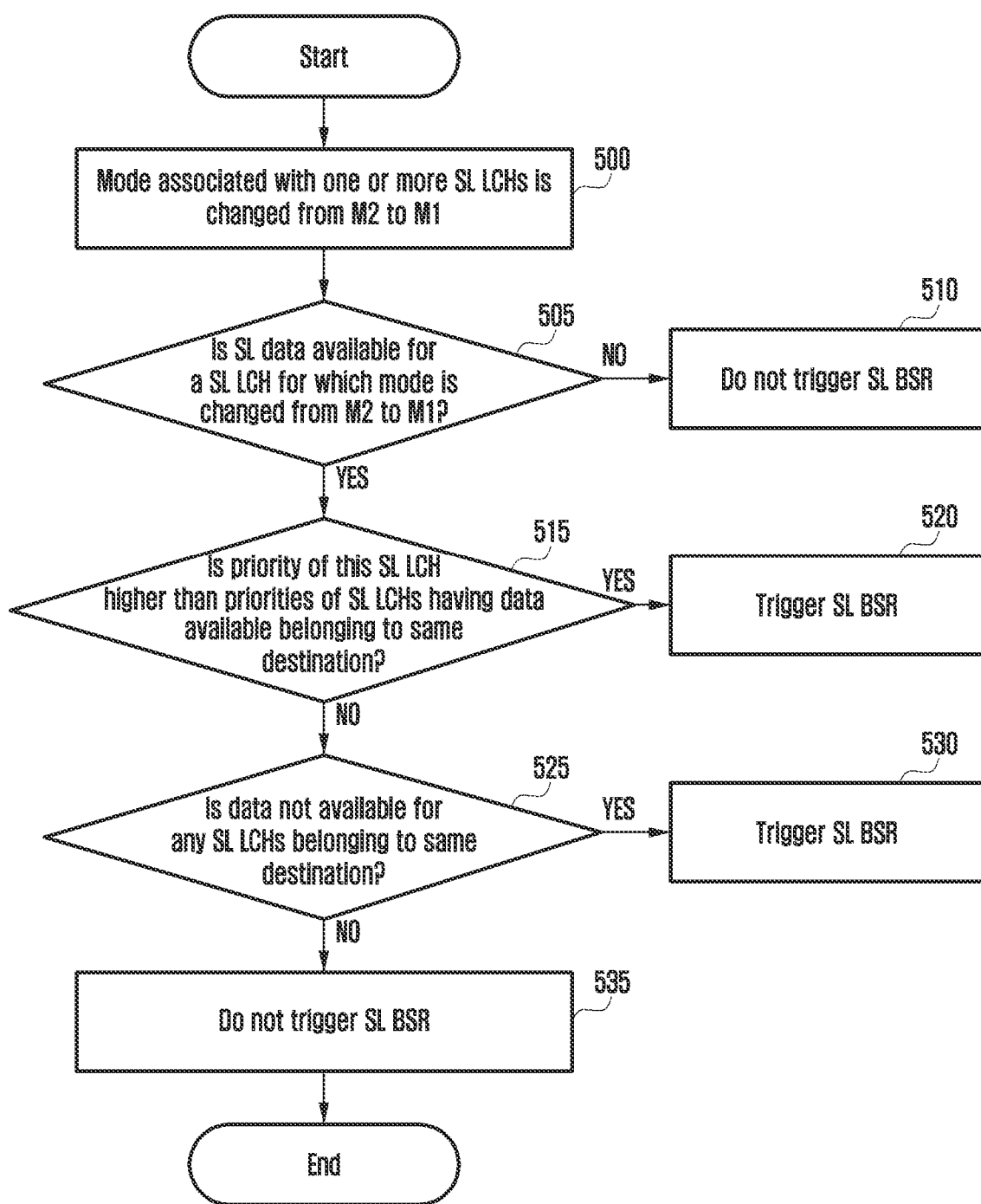
FIG. 5 illustrates another embodiment of UE operation when scheduling mode is changed from M2 to M1 for one or more SL LCHs according to an embodiment of the disclosure.

FIG. 5 illustrates another embodiment of UE operation when scheduling mode is changed from M2 to M1 for one or more SL LCHs according to an embodiment of the disclosure.

Referring to FIG. 5, UE operation when scheduling mode is changed from M2 (i.e. UE autonomous Resource Allocation) to M1 (i.e. Scheduled Resource Allocation) for one or more SL LCHs at operation 500 is as follows:

In an embodiment of this method, if SL data (i.e. packets or RLC SDUs) is available for transmission in the RLC entity of SL LCH of a destination and for this SL LCH mode is changed from M2 to M1 at operation 505, and either priority of this SL LCH is higher than priorities of SL LCHs having data available for transmission belonging to same destination at operation 515, or data is not available for transmission in any SL LCHs belonging to same destination at operation 525, UE (i.e. MAC entity in UE) triggers SL BSR at operation 520, at operation 530. If not, UE does not trigger SL BSR at operation 510, at operation 535. Note that if above condition is met for multiple SL LCHs, only one SL BSR is triggered.

In an embodiment of this method, if SL data (i.e. packets or PDCP SDUs) is available for transmission in the PDCP entity of SL LCH of a destination and for this SL LCH mode is changed from M2 to M1 at operation 505, and either priority of this SL LCH is higher than priorities of SL LCHs having data available for transmission belonging to same destination at operation 515, or data is not available for transmission in any SL LCHs belonging to same destination at operation 525, UE (i.e. MAC entity in UE) triggers SL BSR at operation 520, at operation 530. If not, UE does not trigger SL BSR at operation 510, at operation 535. Note that if above condition is met for multiple SL LCHs, only one SL BSR is triggered.

In another embodiment of this method, if SL data for a SL LCH of a destination for which mode is changed from M2 to M1 and which belongs to an LCG, becomes available to the MAC entity at operation 505, and either priority of this SL LCH is higher than priorities of SL LCHs having data available for transmission belonging to same destination at operation 515, or data is not available for transmission in any SL LCHs belonging to same destination at operation 525, UE (i.e. MAC entity in UE) triggers SL BSR at operation 520, at operation 530. If not, UE does not trigger SL BSR at operation 510, at operation 535. Note that if this condition is met for multiple SL LCHs, only one SL BSR is triggered.

In another embodiment of this method, if SL data for a SL LCH of a destination for which mode is changed from M2 to M1, becomes available to the MAC entity at operation 505, and either priority of this SL LCH is higher than priorities of SL LCHs having data available for transmission belonging to same destination at operation 515, or data is not available for transmission in any SL LCHs belonging to same destination at operation 525, UE (i.e. MAC entity in UE) triggers SL BSR at operation 520, at operation 530. If not, UE does not trigger SL BSR at operation 510, at operation 535. Note that if this condition is met for multiple SL LCHs, only one SL BSR is triggered.

For the triggered SL BSR, UE includes SL BSR MAC CE in MAC PDU and transmit it to the gNB using UL SCH resource. If UL SCH resource is not available or if UL SCH resource is available but the SL BSR MAC CE cannot be accommodated in the UL SCH resource, UE may also trigger scheduling request wherein scheduling request is sent to gNB using PUCCH resource.

In an embodiment, triggered SL BSR is a regular SL BSR. SL BSR MAC CE for SL BSR includes data volume for one or more LCGs wherein for each reported LCG, 'buffer size, LCG ID and destination index' is included in SL BSR.

In another embodiment, triggered SL BSR is a truncated SL BSR wherein data volume of LCG(s) associated with SL LCH(s) for which mode is changed is reported. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a truncated SL BSR wherein data volume of LCG(s) associated with SL LCH(s) for which 'mode is changed and SL data is available for transmission' is reported. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a special SL BSR wherein data volume of LCG(s) associated with SL LCH(s) for which mode is changed is reported. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

In another embodiment, triggered SL BSR is a special SL BSR wherein data volume of LCG(s) associated with SL LCH(s) for which 'mode is changed and SL data is available for transmission' is reported. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

Method 3 gNB signals scheduling mode (M1 or M2 or both) associated with each SL LCH. The signaling can be via RRC message. Later scheduling mode associated with one or more SL LCHs is changed by gNB wherein the gNB sends RRC signaling message (or another signaling method such as MAC CE) with updated association between SL LCH(s) and scheduling modes. Scheduling mode associated with one or more SL LCHs can also be changed by UE when criteria to change mode is met. The criteria can be based on SL quality or CBR measurement of SL resources, etc.

Figure 6:
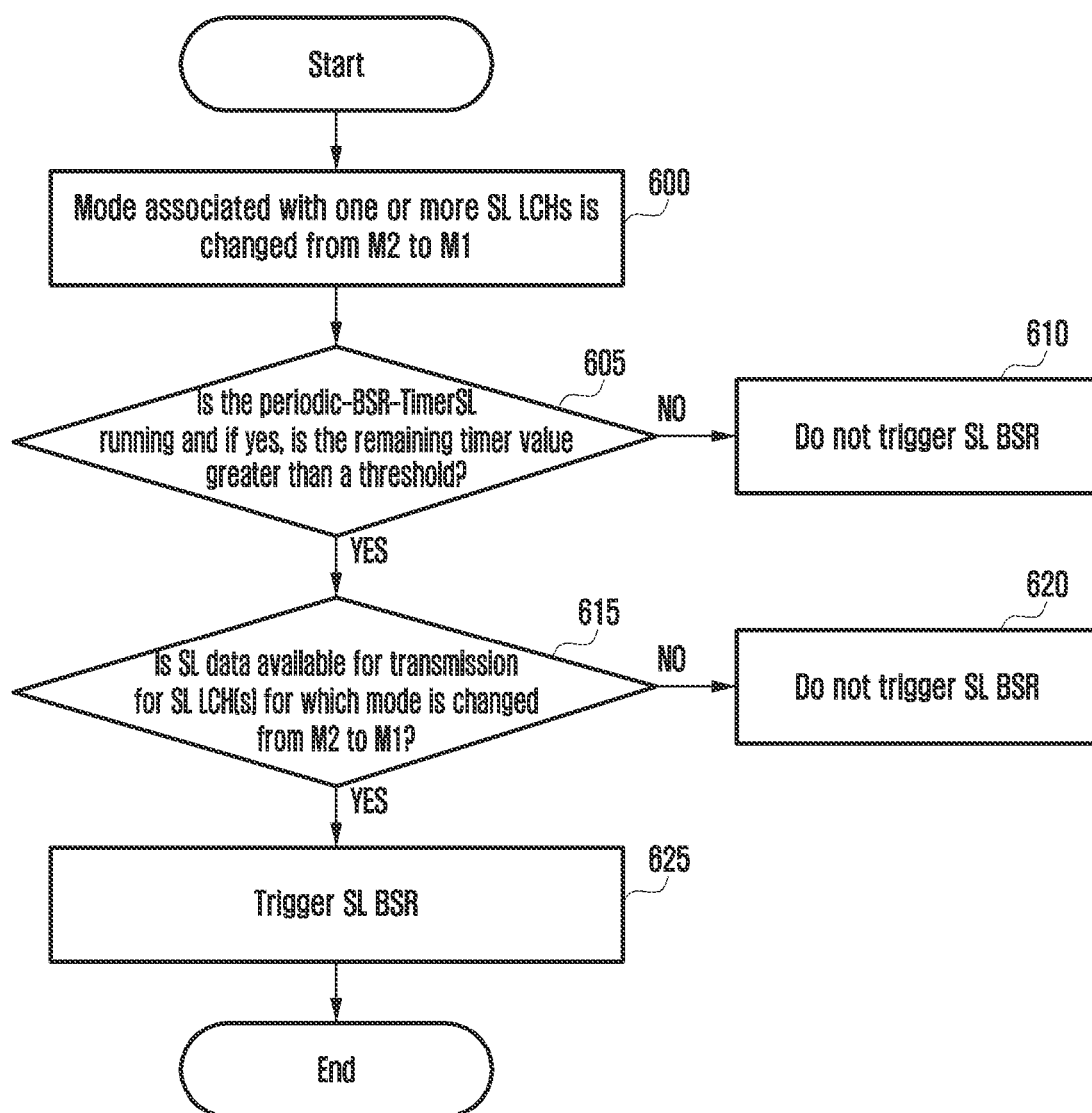
FIG. 6 illustrates another embodiment of UE operation when scheduling mode is changed from M2 to M1 for one or more SL LCHs according to an embodiment of the disclosure.

FIG. 6 illustrates another embodiment of UE operation when scheduling mode is changed from M2 to M1 for one or more SL LCHs according to an embodiment of the disclosure.

Figure 7:
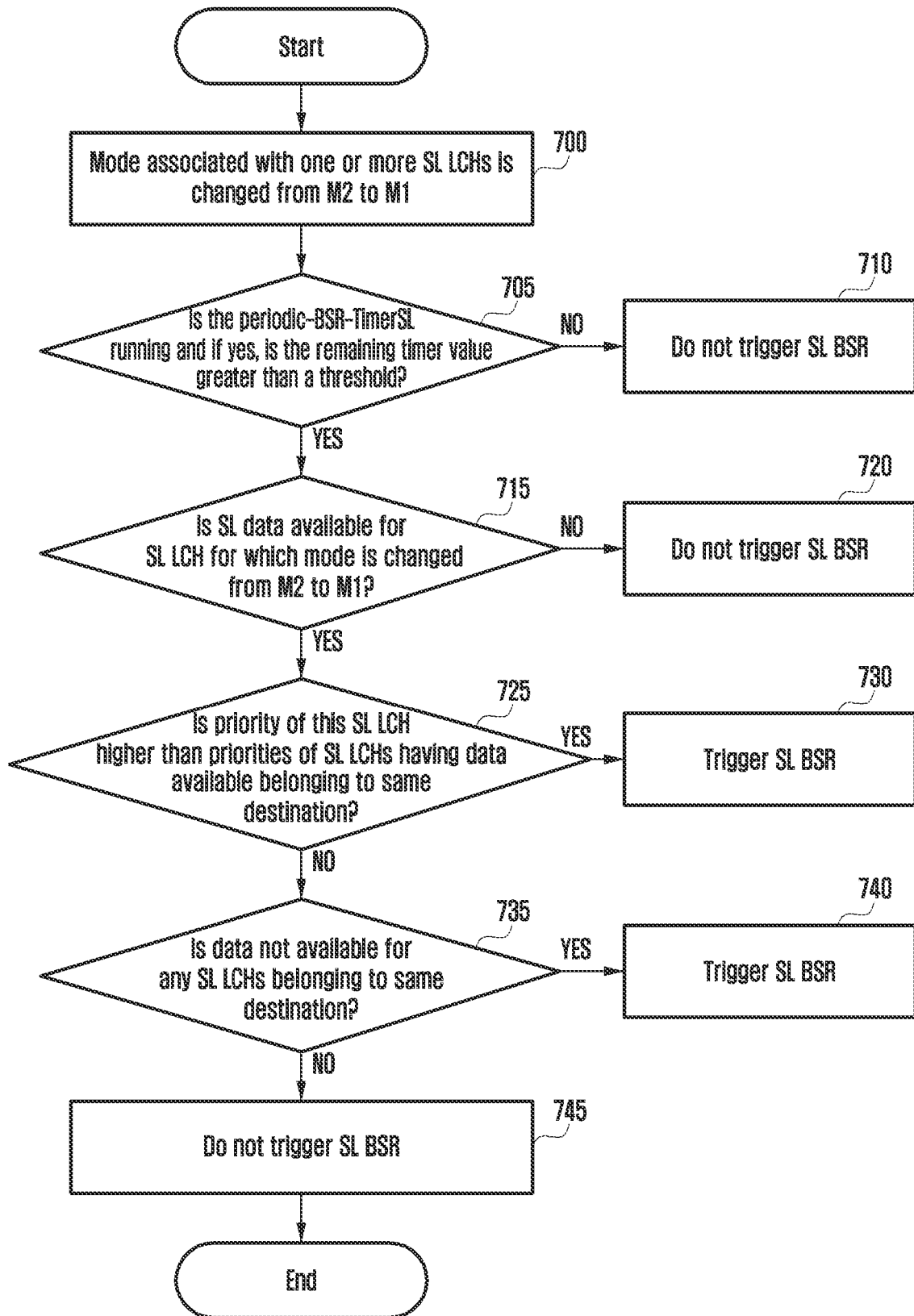
FIG. 7 illustrates another embodiment of UE operation when scheduling mode is changed from M2 to M1 for one or more SL LCHs according to an embodiment of the disclosure.

FIG. 7 illustrates another embodiment of UE operation when scheduling mode is changed from M2 to M1 for one or more SL LCHs according to an embodiment of the disclosure.

Referring to FIGS. 6 and 7, UE operation when scheduling mode is changed from M2 (i.e. UE autonomous Resource Allocation) to M1 (i.e. Scheduled Resource Allocation) for one or more SL LCHs (step 600 or step 700) is as follows:

In an embodiment of this method, if the periodic-BSR-TimerSL is running and remaining timer value is greater than a threshold, UE trigger SL BSR. Threshold is signaled by gNB using RRC signaling.

Referring to FIG. 6, if the periodic-BSR-TimerSL is running and remaining timer value is greater than a threshold at operation 605, UE perform the operation as defined in method 1. Threshold is signaled by gNB using RRC signaling If SL data is available for transmission for SL LCH for which mode is changed from M2 to M1 at operation 615, UE triggers SL BSR at operation 625. If not, UE does not trigger SL BSR at operation 610, at operation 620.

Referring to FIG. 7, if the periodic-BSR-TimerSL is running and remaining timer value is greater than a threshold at operation 705, UE perform the operation as defined in method 2. Threshold is signaled by gNB using RRC signaling. if SL data is available for transmission for SL LCH of a destination and for this SL LCH mode is changed from M2 to M1 at operation 715, and either priority of this SL LCH is higher than priorities of SL LCHs having data available for transmission belonging to same destination at operation 725, or data is not available for transmission in any SL LCHs belonging to same destination at operation 735, UE triggers SL BSR at operation 730, at operation 740). If not, UE does not trigger SL BSR at operation 710, at operation 720, at operation 745.

For the triggered SL BSR, UE includes SL BSR MAC CE in MAC PDU and transmit it to the gNB using UL SCH resource. If UL SCH resource is not available or if UL SCH resource is available but the SL BSR MAC CE cannot be accommodated in the UL SCH resource, UE may also trigger scheduling request wherein scheduling request is sent to gNB using PUCCH resource.

Scheduling Mode is Changed from M1 to M2 for One or More SL LCH(s)

It is noted that the methods disclosed in this embodiment are also applicable for the case when scheduling mode is changed from M1+M2 to M2 for one or more SL LCH(s).

Method 1 gNB signals scheduling mode (M1 or M2 or both) associated with each SL LCH. The signaling can be via RRC message. Later scheduling mode associated with one or more SL LCHs is changed by gNB wherein the gNB sends RRC signaling message (or another signaling method such as MAC CE) with updated association between SL LCH(s) and scheduling modes. Scheduling mode associated with one or more SL LCHs can also be changed by UE when criteria to change mode is met. The criteria can be based on SL quality or CBR measurement of SL resources, etc.

Figure 8:
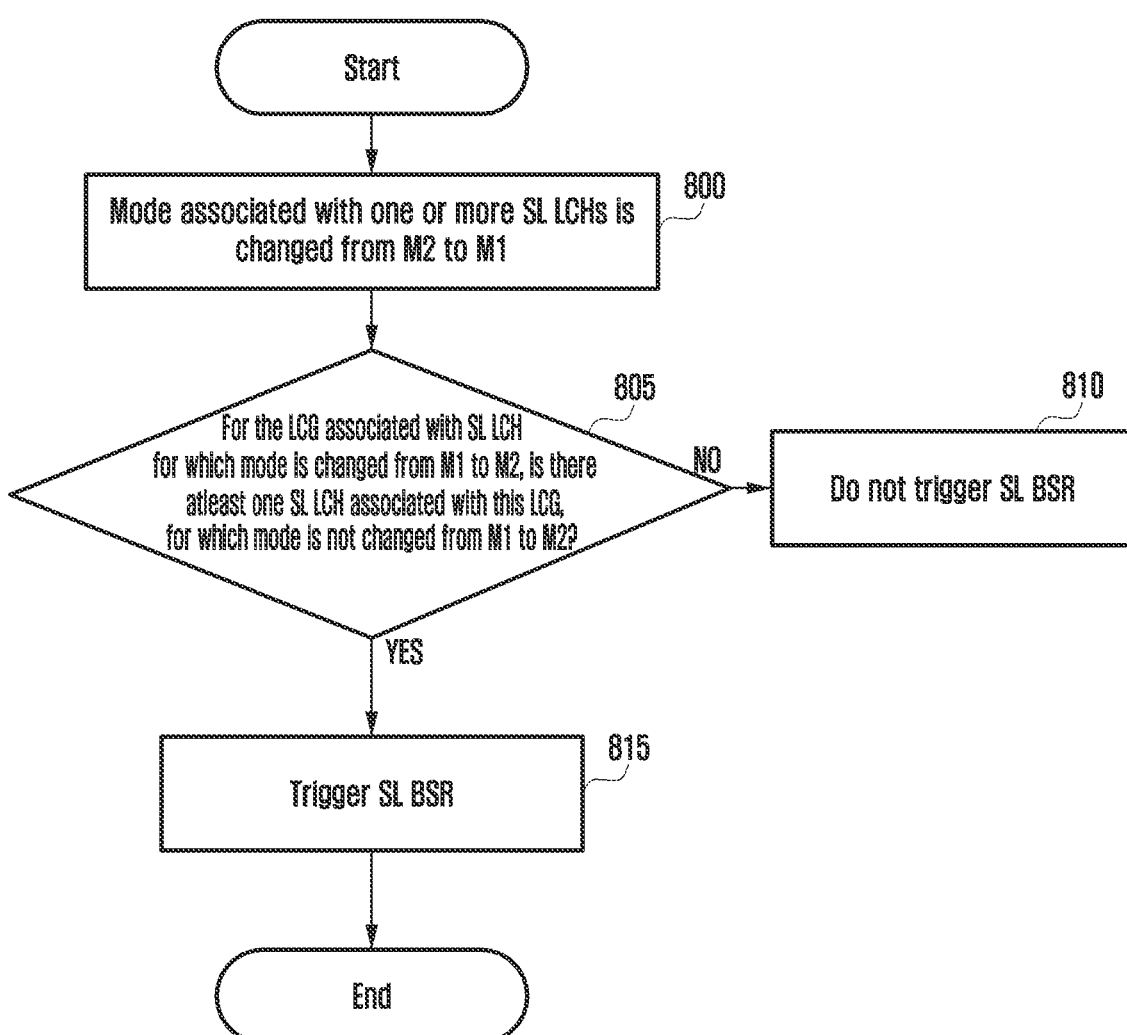
FIG. 8 illustrates an embodiment of UE operation when scheduling mode is changed from M1 to M2 for one or more SL LCHs according to an embodiment of the disclosure.

FIG. 8 illustrates an embodiment of UE operation when scheduling mode is changed from M1 to M2 for one or more SL LCHs according to an embodiment of the disclosure.

Referring to FIG. 8, UE operation when scheduling mode is changed from M1 (i.e. Scheduled Resource Allocation) to M2 (i.e. UE autonomous Resource Allocation) for one or more SL LCHs at operation 800 is as follows:

For the LCG associated with SL LCH of a destination for which mode is changed from M1 to M2, if there is at least one SL LCH associated with that LCG for which mode is not changed from M1 to M2 at operation 805, trigger SL BSR at operation 815. Let's say LCH 1, LCH 2, LCH 3 and LCH 4 of a destination are mapped to LCG X. LCH 1, LCH 2, LCH 3 and LCH 4 are all mapped to M1. Based on NW/UE trigger scheduling mode is changed for LCH3. Since LCG X is associated with LCH 3 and there are other LCHs associated with LCGX for which mode is not changed, UE trigger SL BSR. If not, UE does not trigger SL BSR at operation 810.

For the triggered SL BSR, UE includes SL BSR MAC CE in MAC PDU and transmit it to the gNB using UL SCH resource. If UL SCH resource is not available or if UL SCH resource is available but the SL BSR MAC CE cannot be accommodated in the UL SCH resource, UE may also trigger scheduling request wherein scheduling request is sent to gNB using PUCCH resource.

In an embodiment, triggered SL BSR is a regular SL BSR. SL BSR MAC CE for SL BSR includes data volume for one or more LCGs wherein for each reported LCG, 'buffer size, LCG ID and destination index' is included in SL BSR.

In another embodiment, triggered SL BSR is a truncated SL BSR wherein data volume of following LCGs is reported: LCG associated with SL LCH of a destination for which mode is changed from M1 to M2. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a truncated SL BSR wherein data volume of following LCG(s) is reported: LCG associated with SL LCH of a destination for which mode is changed from M1 to M2 and for which there is at least one SL LCH associated with that LCG for which mode is not changed from M1 to M2. SL BSR MAC CE for truncated SL BSR includes data volume for one or more LCGs wherein for each reported LCG, 'buffer size, LCG ID and destination index' is included in truncated SL BSR.

In another embodiment, triggered SL BSR is a special SL BSR wherein data volume of following LCGs is reported: LCG associated with SL LCH of a destination for which mode is changed from M1 to M2. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

In another embodiment, triggered SL BSR is a special SL BSR wherein data volume of following LCG(s) is reported: LCG associated with SL LCH of a destination for which mode is changed from M1 to M2 and for which there is at least one SL LCH associated with that LCG for which mode is not changed from M1 to M2. SL BSR MAC CE for special SL BSR includes data volume for one or more LCGs wherein for each reported LCG, 'buffer size, LCG ID and destination index' is included in special SL BSR. LCID in MAC header for special BSR MAC CE is different from LCID used for truncated and regular SL BSR MAC CE, so that gNB can know that this SL BSR is special SL BSR. gNB will then use information received in special BSR in addition to last reported regular BSR for scheduling.

Method 2 gNB signals scheduling mode (M1 or M2 or both) associated with each SL LCH. The signaling can be via RRC message. Later scheduling mode associated with one or more SL LCHs is changed by gNB wherein the gNB sends RRC signaling message (or another signaling method such as MAC CE) with updated association between SL LCH(s) and scheduling modes. Scheduling mode associated with one or more SL LCHs can also be changed by UE when criteria to change mode is met. The criteria can be based on SL quality or CBR measurement of SL resources, etc.

Figure 9:
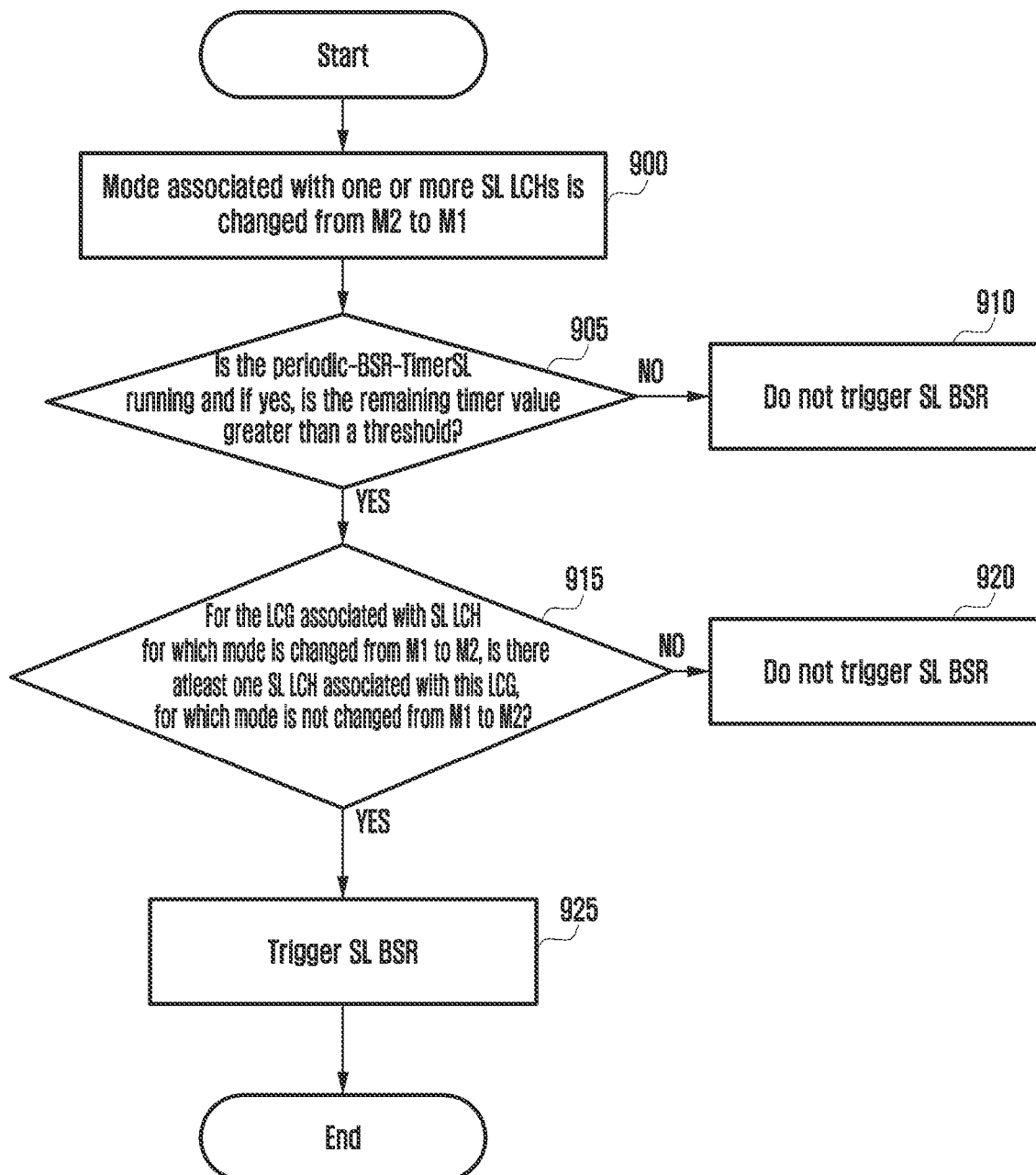
FIG. 9 illustrates another embodiment of UE operation when scheduling mode is changed from M1 to M2 for one or more SL LCHs according to an embodiment of the disclosure.

FIG. 9 illustrates another embodiment of UE operation when scheduling mode is changed from M1 to M2 for one or more SL LCHs according to an embodiment of the disclosure.

Referring to FIG. 9, UE operation when scheduling mode is changed from M1 (i.e. Scheduled Resource Allocation) to M2 (i.e. UE autonomous Resource Allocation) for one or more SL LCHs at operation 900 is as follows:

In an embodiment of this method, if the periodic-BSR-TimerSL is running and remaining timer value is greater than a threshold, UE trigger SL BSR. Threshold is signaled by gNB using RRC signaling. In another embodiment of this method referring to FIG. 9, if the periodic-BSR-TimerSL is running and remaining timer value is greater than a threshold at operation 905, UE perform the operation as defined in method 1. Threshold is signaled by gNB using RRC signaling. For the LCG associated with SL LCH of a destination for which mode is changed from M1 to M2, if there is at least one SL LCH associated with that LCG for which mode is not changed from M1 to M2 at operation 915, trigger SL BSR at operation 925. If not, UE does not trigger SL BSR at operation 910, at operation 920.

Preamble Group Handling for Random Access Procedure

In the legacy 4 step contention based random access procedure, UE can be configured with two sets of preambles, random access preambles group A and random access preambles group B. During 4 step contention based random access procedure, for each random access preamble transmission, UE determines the random access preamble group as follows:

1> if Msg3 has not yet been transmitted:
2> if Random Access Preambles group B is configured:
3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
3> if the Random Access procedure was initiated for the CCCH logical channel and the CCCH SDU size plus MAC subheader is greater than ra-Msg3SizeGroupA:
4> select the Random Access Preambles group B.
3> else:
4> select the Random Access Preambles group A.
2> else:
3> select the Random Access Preambles group A.
1> else (i.e. Msg3 is being retransmitted):
2> select the same group of Random Access Preambles as was used for the Random Access Preamble transmission attempt corresponding to the first transmission of Msg3.

If Random Access Preambles group B is configured, at least one of the parameters ra-Msg3SizeGroupA, messagePowerOffsetGroupB, msg3-DeltaPreamble and preambleReceivedTargetPower are signaling by gNB in Random access configuration.

2 step random access is also supported in NR. In the 2 step contention based random access procedure, UE can be configured with two sets of preambles, random access preambles group A and random access preambles group B and two sets of PUSCH resources for MsgA MAC PDU transmission. Before transmitting the MsgA in a 2 step random access, if contention free resources are not provided by gNB, UE needs to select the random access preambles group A or B.

Embodiment 1

In one embodiment it is proposed that gNB signals two sets of following parameters: Message size of group A, power offset for group B, delta preamble and preamble received target power. Note that these parameters are configured per BWP and signalled to UE using system information and/or dedicated RRC signaling message. The UE uses the parameters configured for the UL BWP on which UE performs random access procedure (i.e. UL BWP on which UE transmits preamble in case of 4 step random access and transmits MsgA in case of 2 step random access).

Set 1 consists of at least one of parameters ra-Msg3SizeGroupA, messagePowerOffsetGroupB. msg3-DeltaPreamble and preambleReceivedTargetPower. These parameters are used to select random access preambles group for 4 step random access.

Set 2 consists of at least one of parameters ra-MsgASizeGroupA, messagePowerOffsetGroupBMsgA. msgA-DeltaPreamble and preambleReceivedTargetPowerMsgA. These parameters are used to select random access preambles group for 2 step random access. If any of these parameters are not configured (in the UL BWP for the random access), UE uses the corresponding parameter from Set 1 (in the UL BWP for the random access).

For 2 step Random Access Preambles group is selected as follows:

If preambleReceivedTargetPowerMsgA is received from gNB for 2 step random access, set PREAMBLE_RECEIVED_TARGET_POWER to preambleReceivedTargetPowerMsgA. Otherwise set PREAMBLE_RECEIVED_TARGET_POWER to preambleReceivedTargetPower.

If msgA-DeltaPreamble is received from gNB for 2 step random access, set MSGA_DELTA_PREAMBLE to msgA-DeltaPreamble. Otherwise set MSGA_DELTA_PREAMBLE to msg3-DeltaPreamble.

If messagePowerOffsetGroupBMsgA is received from gNB for 2 step random access, set MESSAGE_POWER_OFFSET_GROUP_B_MSA to messagePowerOffsetGroupBMsgA. Otherwise set MESSAGE_POWER_OFFSET_GROUP_B_MSA to messagePowerOffsetGroupB.

if Random Access Preambles group B is configured:
  if the potential MsgA size (UL data available for transmission plus MAC header and, where required, MAC CEs) is greater than ra-MsgASizeGroupA and the pathloss is less than PCMAX (of the Serving Cell performing the Random Access Procedure) PREAMBLE_RECEIVED_TARGET_POWER MSGA_DELTA_PREAMBLE—MESSAGE_POWER_OFFSET_GROUP_B_MSA; or
  if the Random Access procedure was initiated for the CCCH logical channel and the CCCH SDU size plus MAC subheader is greater than MSGA_SIZE_GROUP_A:
  select the Random Access Preambles group B.
  else:
    select the Random Access Preambles group A.
  else if Random Access Preambles group B is not configured:
  select the Random Access Preambles group A.

The 2 step Random Access Preambles group selection is performed before the first transmission of MsgA using contention based random access resources during random access procedure.

Embodiment 2

Step 0: During the random access procedure initialization, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure.

Upon selecting the UL carrier, UE determines the UL and DL BWP for random access procedure as specified in section 5.15 of TS 38.321 and described below.
  if PRACH occasions are not configured for the active UL BWP: switch the active UL BWP to BWP indicated by initialUplinkBWP; if the Serving Cell is an SpCell: switch the active DL BWP to BWP indicated by initialDownlinkBWP.
  if PRACH occasions are configured for the active UL BWP: if the Serving Cell is an SpCell and if the active DL BWP does not have the same bwp-Id as the active UL BWP, switch the active DL BWP to the DL BWP with the same bwp-Id as the active UL BWP.
  perform the Random Access procedure on the active DL BWP of SpCell and active UL BWP of this Serving Cell.

UE then determine whether to perform 2 step or 4 step RACH for this random access procedure.
  If this random access procedure is initiated by PDCCH order and if the ra-PreambleIndex explicitly provided by PDCCH is not 0b000000, UE selects 4 step RACH.
  else if 2 step contention free random access resources are signaled by gNB for this random access procedure, UE selects 2 step RACH.
  else if 4 step contention free random access resources are signaled by gNB for this random access procedure, UE selects 4 step RACH.
  else if the UL BWP selected for this random access procedure is configured with only 2 step RACH resources, UE selects 2 step RACH.
  else if the UL BWP selected for this random access procedure is configured with only 4 step RACH resources, UE selects 4 step RACH.
  else if the UL BWP selected for this random access procedure is configured with both 2 step and 4 step RACH resources,
  if RSRP of the downlink pathloss reference is below a configured threshold, UE selects 4 step RACH. Otherwise UE selects 2 step RACH.

UL carrier for random access procedure is explicitly signaled by gNB during handover or reconfiguration with sync for 4 step RACH. If gNB wants UE to select NUL for 4 step RACH, it provides 4 step contention free random access resources for NUL in reconfiguration message. If gNB wants UE to select SUL for 4 step RACH, it provides 4 step contention free random access resources for SUL in reconfiguration message. In an embodiment, UL carrier for 2 step random access procedure is also explicitly signaled by gNB during handover or reconfiguration with sync. If gNB want UE to select NUL for 2 step RACH, it provides 2 step contention free random access resources for NUL in reconfiguration message. If gNB wants UE to select SUL for 2 step RACH, it provides 2 step contention free random access resources for SUL in reconfiguration message.

If 2 step contention free random access resources for SUL is signaled by gNB during handover or reconfiguration with sync, UE selects SUL and RACH type selected is 2 step RACH. If 2 step contention free random access resources for NUL is signaled by gNB during handover or reconfiguration with sync, UE selects NUL and RACH type selected is 2 step RACH. If 4 step contention free random access resources for SUL is signaled by gNB during handover or reconfiguration with sync, UE selects SUL and RACH type selected is 4 step RACH. If 4 step contention free random access resources for NUL is signaled by gNB during handover or reconfiguration with sync, UE selects NUL and RACH type selected is 4 step RACH.

Based on the above criteria, UE has selected 2 step RA procedure. UE initializes the preamble transmission counter (PREAMBLE_TRANSMISSION_COUNTER) to zero.

Step 1: If contention Free Random Access Resources are provided by gNB and there is at least one SSB/CSI RS having SS-RSRP/CSI-RSRP above a threshold amongst the SSBs/CSI RSs for which contention free random access resources are provided, UE transmit Random Access Preamble in PRACH occasion and MAC PDU in PUSCH Occasion using the assigned contention free random access resources. Otherwise, UE transmit Random Access Preamble in PRACH occasion and MAC PDU in PUSCH Occasion using the contention based random access resources. In an embodiment, it is possible that a valid PUSCH occasion is not available corresponding to selected SSB/CSI-RS and in this case UE skips transmission of MsgA MAC PDU. For transmitting Random Access Preamble in PRACH occasion and MAC PDU in PUSCH Occasion using the contention based random access resources, UE selects random access preamble group and then selects a random access preamble from the selected group in this step. If UE has previously selected a preamble random access preamble group during this random access procedure, UE selects the same preamble group. Otherwise, the random access preamble group is selected as follows:

if Random Access Preambles group B is configured:
  if the potential MsgA size (UL data available for transmission plus MAC header and, where required, MAC CEs) is greater than ra-MsgASizeGroupA and the pathloss is less than PCMAX (of the Serving Cell performing the Random Access Procedure) PREAMBLE_RECEIVED_TARGET_POWER MSGA_DELTA_PREAMBLE—MESSAGE_POWER_OFFSET_GROUP_B_MSA; or
  if the Random Access procedure was initiated for the CCCH logical channel and the CCCH SDU size plus MAC subheader is greater than MSGA_SIZE_GROUP_A:
  select the Random Access Preambles group B.
  else:
    select the Random Access Preambles group A.
  else if Random Access Preambles group B is not configured:
  select the Random Access Preambles group A.

In one embodiment it is proposed that gNB signals two sets of following parameters: Message size of group A, power offset for group B, delta preamble and preamble received target power. Note that these parameters are configured per BWP and signalled to UE using system information and/or dedicated RRC signaling message.

Set 1 consists of at least one of parameters ra-Msg3SizeGroupA, messagePowerOffsetGroupB. msg3-DeltaPreamble and preambleReceivedTargetPower. These parameters are used to select random access preambles group for 4 step random access.

Set 2 consists of at least one of parameters ra-MsgASizeGroupA, messagePowerOffsetGroupBMsgA. msgA-DeltaPreamble and preambleReceivedTargetPowerMsgA. These parameters are used to select random access preambles group for 2 step random access. If any of these parameters are not configured, UE uses the corresponding parameter from Set 1.

In an embodiment, ra-MsgASizeGroupA is not explicitly signalled. It is equal to the transport block size of the MSGA payload associated with preamble group A. UE can determine this based on PUSCH resource configuration associated with preamble group A.

For 2 step Random Access Preambles group is selected as follows:

If preambleReceivedTargetPowerMsgA is received from gNB for 2 step random access (in the configuration of UL BWP of this random access procedure i.e. in the configuration of UL BWP on which UE transmits MsgA for this random access procedure), set PREAMBLE_RECEIVED_TARGET_POWER to preambleReceivedTargetPowerMsgA. Otherwise set PREAMBLE_RECEIVED_TARGET_POWER to preambleReceivedTargetPower (from the configuration of UL BWP of this random access procedure i.e. from the configuration of UL BWP on which UE transmits MsgA for this random access procedure).

If msgA-DeltaPreamble is received from gNB for 2 step random access (in the configuration of UL BWP of this random access procedure i.e. in the configuration of UL BWP on which UE transmits MsgA for this random access procedure), set MSGA_DELTA_PREAMBLE to msgA-DeltaPreamble. Otherwise set MSGA_DELTA_PREAMBLE to msg3-DeltaPreamble (from the configuration of UL BWP of this random access procedure i.e. from the configuration of UL BWP on which UE transmits MsgA for this random access procedure).

If messagePowerOffsetGroupBMsgA is received from gNB for 2 step random access (in the configuration of UL BWP of this random access procedure i.e. in the configuration of UL BWP on which UE transmits MsgA for this random access procedure), set MESSAGE_POWER_OFFSET_GROUP_B_MSA to messagePowerOffsetGroupBMsgA. Otherwise set MESSAGE_POWER_OFFSET_GROUP_B_MSA to messagePowerOffsetGroupB (from the configuration of UL BWP of this random access procedure i.e. from the configuration of UL BWP on which UE transmits MsgA for this random access procedure).

Step 2: UE then starts msgB-ResponseWindow and monitor the PDCCH for random access response in msgB-ResponseWindow. UE monitors the PDCCH of the SpCell for a random access response identified by MSGB-RNTI while the msgB-Response Window is running. If C-RNTI MAC CE was included in the MSGA: UE additionally monitor the PDCCH of the SpCell for random access response identified by the C-RNTI while the msgB-Response Window is running.

Step 3: While msgB-Response Window is running:

If C-RNTI was included in MsgA and UE receives PDCCH addressed to C-RNTI and this random access procedure was initiated for BFR: RAR reception is successful. RA procedure is successfully completed. Go to step 8.

Else If C-RNTI was included in MsgA and Time Alignment Timer (TAT) associated with a Primary Timing Advance Group (PTAG) is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that UE will not use these resources for subsequent random access procedure. Go to step 8. In an embodiment, release operation may not be performed in this case, as contention free resources may not be configured for the case where PTAG is running and RA is initiated for events other than BFR.

Else If C-RNTI was included in MsgA and TAT timer associated with PTAG is not running and UE receives PDCCH addressed to C-RNTI and DL Transport Block (TB) scheduled by this PDCCH includes Absolute timing advanced command MAC CE: RAR reception is successful.

RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else If UE receives PDCCH addressed to MSGB-RNTI and decoded TB includes fallbackRAR MAC subPDU corresponding to its transmitted preamble: RAR reception is successful.

If random access preamble transmitted is contention free random access preamble: RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else

Transmit MsgA MAC PDU as Msg3 in UL grant received in fallbackRAR

Start contention resolution timer

Go to step 5

Else If UE receives PDCCH addressed to MSGB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8. Note that this is the case when CCCH SDU is included in MsgA, that is UE is in idle/inactive or performing RRC connection re-establishment. For these cases contention free resources are not configured, so no need to release. In an alternate embodiment, UE releases the 2 step CFRA resources (random access preamble(s), RACH occasions, PUSCH resources) configured (if any) for this random access procedure. Release here means that UE will not use these resources for subsequent random access procedure.

Step 4: If RAR window expires:

Increment preamble transmission counter by 1.

If msgATransMax is configured, and if PREAMBLE_TRANSMISSION_COUNTER=msgATransMax+1:

Switch to 4 step RA. Go to step 7.

Else:

go to step 1

Step 5: While contention resolution timer is running:

If the Random Access procedure was initiated for beam failure recovery and the UE receives PDCCH transmission addressed to the C-RNTI; or if the Random Access procedure was initiated by a PDCCH order and the UE receives PDCCH transmission addressed to the C-RNTI; or if the Random Access procedure was initiated by the MAC sublayer itself or by the RRC sublayer and the UE receives PDCCH transmission addressed to the C-RNTI and contains a UL grant for a new transmission: Contention Resolution is successful; RA procedure is successfully completed. Release 2 step CFRA Resources i.e. preambles/ROs/PUSCH Resources configured (if any) for this RA procedure. Go to step 8. Release here means that UE will not use these resources for subsequent random access procedure.

Step 6: If contention resolution timer expires:

Increment preamble transmission counter by 1.

If msgATransMax is configured, and if PREAMBLE_TRANSMISSION_COUNTER=msgATransMax+1:

Switch to 4 step RA. Go to step 7.

Else:

go to step 1

Step 7: perform 4 step RA. If 4 step CFRA resources are configured, these will be released when RA procedure is completed.

During the 4 step RA attempts, UE selects the random access preamble group. If random access preamble group was selected during the 2 step RA attempts of this random access procedure, UE shall select the same random access preamble group for 4 step RA. Otherwise UE will select the random access preamble group as follows:

1> if Msg3 has not yet been transmitted:
2> if Random Access Preambles group B is configured:
3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
3> if the Random Access procedure was initiated for the CCCH logical channel and the CCCH SDU size plus MAC subheader is greater than ra-Msg3SizeGroupA:
4> select the Random Access Preambles group B.
3> else:
4> select the Random Access Preambles group A.
2> else:
3> select the Random Access Preambles group A.
1> else (i.e. Msg3 is being retransmitted):
2> select the same group of Random Access Preambles as was used for the Random Access Preamble transmission attempt corresponding to the first transmission of Msg3.

Step 8: Stop.

Embodiment 3

For 2 step Random Access Preambles group is selected as follows:

if Random Access Preambles group B is configured:
if the potential MsgA size (UL data available for transmission plus MAC header and, where required, MAC CEs) is greater than ra-MsgASizeGroupA and the power 'P' is less than PCMAX (of the Serving Cell performing the Random Access Procedure); or
if the Random Access procedure was initiated for the CCCH logical channel and the CCCH SDU size plus MAC subheader is greater than MSGA_SIZE_GROUP_A:
select the Random Access Preambles group B.
else:
select the Random Access Preambles group A.
else if Random Access Preambles group B is not configured:
select the Random Access Preambles group A.

'P' is the power required to transmit MsgA MAC PDU using PUSCH resource configured for group B. P is given by:

$$P = \text{PREAMBLE\_RECEIVED\_TARGET\_POWER} + \text{MSGA\_DELTA\_PUSCH} + \text{ALPHA} * PL + 10 \log_{10}(2^{\mu} \cdot M_{RB,b,f,c}^{PUSCH}) + \Delta_{TF,b,f,c} + f_{b,f,c}$$

'b' is the active UL BWP for MsgA transmission, f is the carrier for MsgA transmission and c is the serving cell index of serving cell to which MsgA is transmitted.

PREAMBLE_RECEIVED_TARGET_POWER is given by preambleReceivedTargetPower signalled by gNB.

MSGA_DELTA_PUSCH is given by parameter msgADeltaPreamble. If msgADeltaPreamble is not signalled by gNB, MSGA_DELTA_PUSCH is given by msg3-DeltaPreamble signalled by gNB.

APLHA is given by parameter msgA-Alpha. If msgA-Alpha is not signalled by gNB, APLHA is equal to 1

$M_{RB,b,f,c}^{PUSCH}$ is the bandwidth of the PUSCH resource assignment expressed in number of resource blocks for PUSCH transmission occasion on active UL BWP b of carrier f of serving cell c and μ is a SCS configuration.

PL is the downlink pathloss calculated as specified in TS 38.213

$\Delta_{TF,b,f,c} + f_{b,f,c}$ is calculated as specified in TS 38.213, subclause 7.1.1

In one embodiment, ra-MsgASizeGroupA is not explicitly signaled. It is equal to the transport block size of the MSGA payload associated with preamble group A. UE can determine this based on PUSCH resource configuration associated with preamble group A.

The 2 step Random Access Preambles group selection is performed before the first transmission of MsgA using contention based random access resources during random access procedure.

Figure 10:
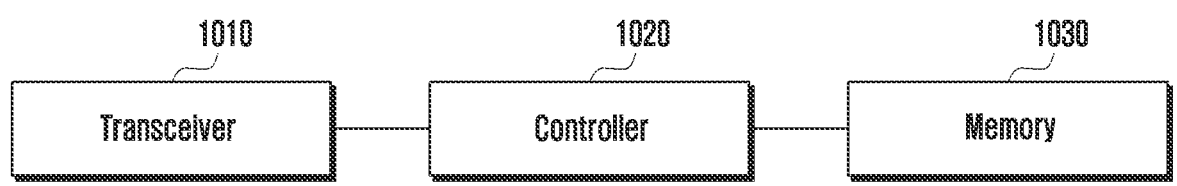
FIG. 10 is a block diagram of a UE according to an embodiment of the disclosure.

FIG. 10 is a block diagram of a terminal according to an embodiment of the disclosure.

Referring to FIG. 10, a terminal includes a transceiver 1010, a controller 1020 and a memory 1030. The controller 1020 may refer to a circuitry, an ASIC, or at least one processor. The transceiver 1010, the controller 1020, and the memory 1030 are configured to perform at least one operation including a combination of operations, which are not in conflict, illustrated in at least one of the drawings, e.g., FIGS. 1-9, or described above. Although the transceiver 1010, the controller 1020, and the memory 1030 are shown as separate entities, they may be realized as a single entity like a single chip. Alternatively, the transceiver 1010, the controller 1020, and the memory 1030 may be electrically connected to or coupled with each other.

The transceiver 1010 may transmit and receive signals to and from other network entities, e.g., a base station.

The controller 1020 may control the UE to perform functions according at least one operation described above.

In an embodiment, the operations of the terminal may be implemented using the memory 1030 storing corresponding program codes. Specifically, the terminal may be equipped with the memory 1030 to store program codes implementing desired operations. To perform the desired operations, the controller 1020 may read and execute the program codes stored in the memory 1030 by using a processor or a central processing unit (CPU).

Figure 11:
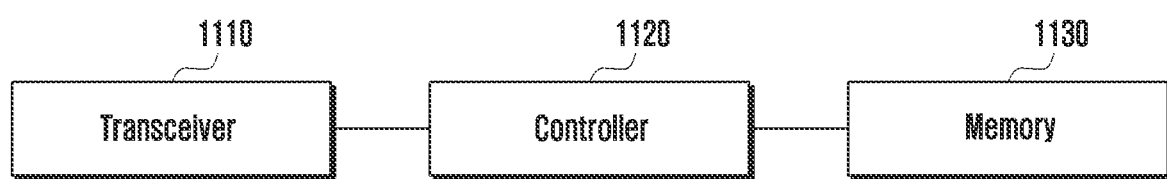
FIG. 11 is a block diagram of a base station according to an embodiment of the disclosure.

FIG. 11 is a block diagram of a base station according to an embodiment of the disclosure.

Referring to FIG. 11, a base station (BS) includes a transceiver 1110, a controller 1120 and a memory 1130. The controller 1120 may refer to a circuitry, an ASIC, or at least one processor. The transceiver 1110, the controller 1120 and the memory 1130 are configured to perform at least one operation including a combination of operations, which are not in conflict, illustrated in at least one of the drawings, e.g., FIGS. 1-9, or described above. Although the transceiver 1110, the controller 1120, and the memory 1130 are shown as separate entities, they may be realized as a single entity like a single chip. Alternatively, the transceiver 1110, the controller 1120, and the memory 1130 may be electrically connected to or coupled with each other.

The transceiver 1110 may transmit and receive signals to and from other network entities, e.g., a terminal.

The controller 1120 may control the BS to perform functions according to at least one operation described above.

In an embodiment, the operations of the BS may be implemented using the memory 1130 storing corresponding program codes. Specifically, the BS may be equipped with the memory 1130 to store program codes implementing desired operations. To perform the desired operations, the controller 1120 may read and execute the program codes stored in the memory 1130 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, a radio resource control (RRC) message configuring a sidelink resource allocation mode 1 while the terminal is configured with a sidelink resource allocation mode 2; and
   transmitting, in case that sidelink data is available for a sidelink logical channel associated with the sidelink resource allocation mode 1 and a priority of the sidelink logical channel is higher than priorities of sidelink logical channels having sidelink data available for a same destination of the sidelink logical channel, a sidelink buffer status report (BSR) to the base station,
   wherein the sidelink BSR is transmitted to the base station in case that a periodic BSR timer is running and a remaining timer value is greater than a threshold.

2. The method of claim 1, further comprising:
   transmitting, in case that the sidelink data is available for the sidelink logical channel and sidelink data is not available for the sidelink logical channels for the same destination of the sidelink logical channel, the BSR to the base station.

3. The method of claim 1, wherein the threshold is configured by the RRC message.

4. A method performed by a base station in a communication system, the method comprising:
   transmitting, to a terminal, a radio resource control (RRC) message configuring a sidelink resource allocation mode 1 while the terminal is configured with a sidelink resource allocation mode 2; and
   receiving, in case that sidelink data is available for a sidelink logical channel associated with the sidelink resource allocation mode 1 and a priority of the sidelink logical channel is higher than priorities of sidelink logical channels having sidelink data available for a same destination of the sidelink logical channel, a sidelink buffer status report (BSR) from the terminal,
   wherein the sidelink BSR is received from the terminal in case that a periodic BSR timer is running and a remaining timer value is greater than a threshold.

5. The method of claim 4, further comprising:
   receiving, in case that the sidelink data is available for the sidelink logical channel and sidelink data is not available for the sidelink logical channels for the same destination of the sidelink logical channel, the BSR from the terminal.

6. The method of claim 4, wherein the threshold is configured by the RRC message.

7. A terminal in a communication system, the terminal comprising:
- a transceiver; and
- a controller coupled with the transceiver and configured to:
  - receive, from a base station, a radio resource control (RRC) message configuring a sidelink resource allocation mode 1 while the terminal is configured with a sidelink resource allocation mode 2, and
  - transmit, in case that sidelink data is available for a sidelink logical channel associated with the sidelink resource allocation mode 1 and a priority of the sidelink logical channel is higher than priorities of sidelink logical channels having sidelink data available for a same destination of the sidelink logical channel, a sidelink buffer status report (BSR) to the base station,
- wherein the sidelink BSR is transmitted to the base station in case that a periodic BSR timer is running and a remaining timer value is greater than a threshold.

8. The terminal of claim 7, wherein the controller is further configured to:
- transmit, in case that the sidelink data is available for the sidelink logical channel and sidelink data is not available for the sidelink logical channels for the same destination of the sidelink logical channel, the BSR to the base station.

9. The terminal of claim 7, wherein the threshold is configured by the RRC message.

10. A base station in a communication system, the base station comprising:
- a transceiver; and
- a controller coupled with the transceiver and configured to:
  - transmit, to a terminal, a radio resource control (RRC) message configuring a sidelink resource allocation mode 1 while the terminal is configured with a sidelink resource allocation mode 2, and
  - receive, in case that sidelink data is available for a sidelink logical channel associated with the sidelink resource allocation mode 1 and a priority of the sidelink logical channel is higher than priorities of sidelink logical channels having sidelink data available for a same destination of the sidelink logical channel, a sidelink buffer status report (BSR) from the terminal,
- wherein the sidelink BSR is received from the terminal in case that a periodic BSR timer is running and a remaining timer value is greater than a threshold.

11. The base station of claim 10, wherein the controller is further configured to:
- receive, in case that the sidelink data is available for the sidelink logical channel and sidelink data is not available for the sidelink logical channels for the same destination of the sidelink logical channel, the BSR from the terminal.

12. The base station of claim 10, wherein the threshold is configured by the RRC message.

* * * * *